O. A. VICTEL & M. E. PORTER.
AUTOMOBILE LIFTING APPLIANCE.
APPLICATION FILED JAN. 30, 1918.
1,270,571.
Patented June 25, 1918.
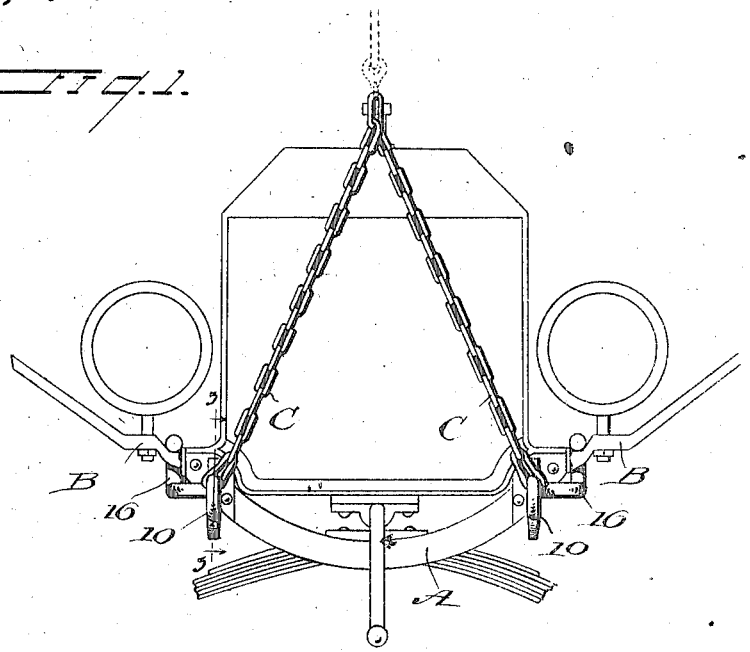
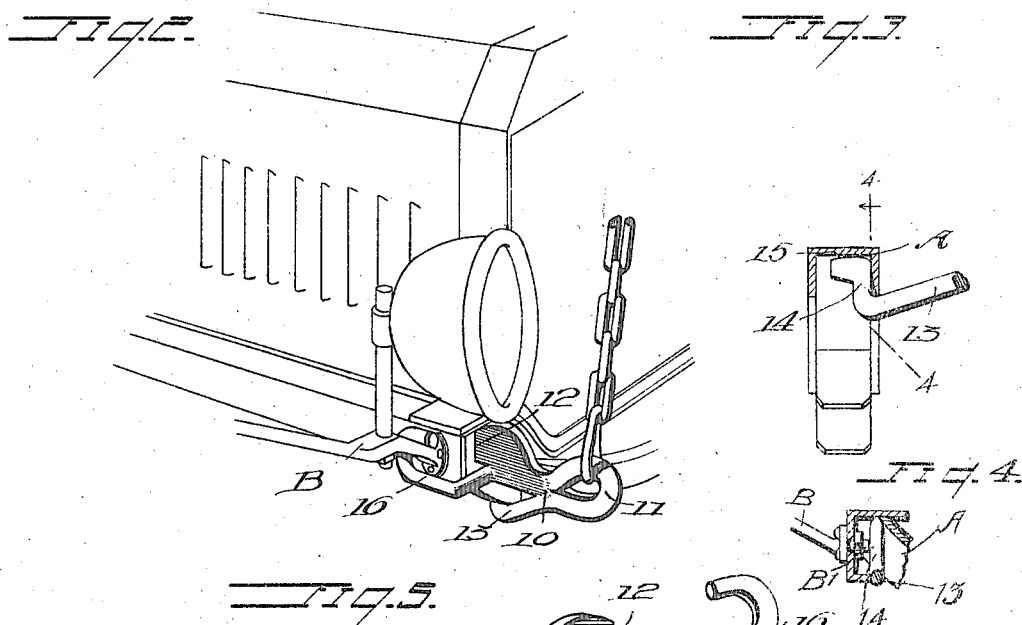

UNITED STATES PATENT OFFICE.

OLAF A. VICTEL AND MAURICE E. PORTER, OF TOLLEY, NORTH DAKOTA.

AUTOMOBILE-LIFTING APPLIANCE.

1,270,571.    Specification of Letters Patent.    Patented June 25, 1918.

Application filed January 30, 1918. Serial No. 214,455.

*To all whom it may concern:*

Be it known that we, OLAF A. VICTEL and MAURICE E. PORTER, citizens of the United States, and residents of Tolley, in the county of Renville and State of North Dakota, have made certain new and useful Improvements in Automobile-Lifting Appliances, of which the following is a specification.

Our invention relates to means whereby to facilitate the elevation of the forward portion of a Ford automobile for purposes of repair, and substitution of parts, our object being the provision of a simple, inexpensive and highly efficient lifting hook for engagement with certain parts of the forward portion of a Ford automobile in order to obviate all danger of slipping and avoid all contact of the lifting chains or connections with the adjacent portion of the frame and body of the machine.

In the accompanying drawing illustrating our present invention:

Figure 1 is a front elevation illustrating the practical application of our invention;

Fig. 2 is a detail perspective view of a portion of Fig. 1;

Fig. 3 is a detail section taken substantially on line 3—3 of Fig. 1;

Fig. 4 is a similar view taken substantially on line 4—4 of Fig. 3; and

Fig. 5 is a detail perspective view of one of our improved lifting hooks.

Referring now to these figures, and particularly to Fig. 1, our invention proposes a lifting hook for Ford automobiles, whose body 10 is provided at one end with an aperture 11, and at its opposite end with a shouldered face 12, and an extension 13, the latter having an angular extremity 14, with a flat terminal 15, for a purpose which will presently be described.

The body 10 is also provided at the same end and adjacent to the shouldered portion 12, with a laterally offset hook 16, whose effective curve is in a plane parallel to the plane of the body 10 as will be seen by reference to Fig. 1 in particular.

As thus constructed, it is obvious that the shouldered surface 12 is adapted to abut the front face of the front frame member A of a Ford automobile adjacent the opposite ends thereof, and that the angular portion 14 of the extension 13 is adapted for engagement at the same time with the top and one side flange of the U-shaped front frame member as seen particularly in Figs. 3 and 4, the flat face 15 abutting the under surface of the top of said front frame member when the body 10 extends in a horizontal plane forwardly with respect to the frame of the car. In this way it is obvious that the extension will be supported against accidental displacement, especially as the portion 14 goes between a portion of the front frame member and the inner end of the front fender bolt and nut B'.

It is also apparent that by virtue of the offsetting of the hook 16 and the manner in which the latter is formed and positioned with respect to the body 10, it is adapted at the same time for engagement with the adjacent lamp bracket B, so that when one of these lifting hooks at each side of the frame of the car is engaged as shown in Fig. 1, the apertured ends 11 of the body 10 extend to points sufficiently beyond the radiator or front of the frame to permit of the reception of lifting chains or like members C, in such manner that the latter will be prevented from contact with the adjacent portions of the car and particularly the radiator.

We claim—

1. A lifting hook for automobiles having an apertured body provided at one end with surfaces approximately at right angles to one another for contact with the lower and forward surfaces of the front frame member of an automobile when said body is in horizontal forwardly extending relation thereto, said body also having a laterally offset hook for engaging a portion of the automobile frame with the body in the position stated.

2. A lifting hook of the type described having a body provided at one end with an opening and having at its opposite end a pair of engaging surfaces approximately at right angles to one another, and a laterally offset hook extending from the last mentioned end of the body and disposed in a plane parallel to the plane of the body for the purposes mentioned.

3. A lifting hook of the type described comprising a body having an aperture at one end and a shouldered engaging surface at its opposite end, said body having an extension at its last mentioned end provided with an angular portion terminating in a flat engaging face approximately at right angles to the said shouldered engaging surface, and a hook extending from the last mentioned end of the body and offset laterally with respect thereto.

4. A lifting hook of the type described, comprising an apertured body having an engaging face at one end substantially at right angles to the longitudinal axis of the body, said body having an inclined extension provided with an angular portion disposed approximately parallel to the said engaging face, and a hook carried by and offset laterally with respect to the said body, for the purpose described.

OLAF A. VICTEL.
M. E. PORTER.